United States Patent
Miyamoto et al.

(10) Patent No.: US 7,515,558 B2
(45) Date of Patent: Apr. 7, 2009

(54) CODE DIVISION MULTIPLE ACCESS COMMUNICATION SYSTEM, AND A BASE STATION CONTROL DEVICE AND A BASE STATION THEREOF

(75) Inventors: Shoichi Miyamoto, Kawasaki (JP); Toshio Kato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1369 days.

(21) Appl. No.: 10/315,712

(22) Filed: Dec. 10, 2002

(65) Prior Publication Data

US 2003/0189907 A1    Oct. 9, 2003

(30) Foreign Application Priority Data

Apr. 9, 2002    (JP)    ............... 2002-106194

(51) Int. Cl.
H04B 7/216    (2006.01)

(52) U.S. Cl. .............. 370/320; 370/335; 370/342; 370/441; 370/341; 455/561; 455/522; 455/509; 455/450; 455/63.1; 455/67.11; 455/434; 375/130; 375/142

(58) Field of Classification Search .......... 370/320, 370/335, 341, 342, 441; 455/13.4, 67.11, 455/67.13, 522, 63.1, 450, 452.1, 561, 464
See application file for complete search history.

(56) References Cited

U.S. PATENT DOCUMENTS

| | | | | |
|---|---|---|---|---|
| 5,666,655 A | * | 9/1997 | Ishikawa et al. | 455/512 |
| 5,722,051 A | * | 2/1998 | Agrawal et al. | 455/69 |
| 5,722,073 A | * | 2/1998 | Wallstedt et al. | 455/437 |
| 5,842,130 A | * | 11/1998 | Oprescu-Surcobe et al. | 455/456.2 |
| 6,029,074 A | * | 2/2000 | Irvin | 455/571 |
| 6,118,983 A | * | 9/2000 | Egusa et al. | 455/69 |
| 6,128,500 A | * | 10/2000 | Raghavan et al. | 455/453 |
| 6,226,316 B1 | * | 5/2001 | Schilling et al. | 375/142 |
| 6,233,222 B1 | * | 5/2001 | Wallentin | 370/229 |
| 6,243,591 B1 | * | 6/2001 | Takemura | 455/522 |
| 6,334,058 B1 | * | 12/2001 | Nystrom et al. | 455/453 |
| 6,335,922 B1 | * | 1/2002 | Tiedemann et al. | 370/335 |
| 6,493,331 B1 | * | 12/2002 | Walton et al. | 370/341 |
| 6,515,978 B1 | * | 2/2003 | Buehrer et al. | 370/342 |
| 6,697,378 B1 | * | 2/2004 | Patel | 370/468 |
| 6,729,929 B1 | * | 5/2004 | Sayers et al. | 455/446 |
| 6,760,587 B2 | * | 7/2004 | Holtzman et al. | 455/436 |

(Continued)

FOREIGN PATENT DOCUMENTS

JP    9-84105    3/1997

(Continued)

OTHER PUBLICATIONS

Japanese Office Action dated Jul. 4, 2006.

Primary Examiner—Marceau Milord
(74) Attorney, Agent, or Firm—Katten Muchin Rosenman LLP

(57) ABSTRACT

Power control of a base station of a CDMA system that includes a plurality of communication terminals and a maintenance terminal is optimized by adjusting one of transmitted power and received power of the base station, based on power distribution values of radio channels used in radio communications, the power distribution values being obtained by counting the number of the radio channels corresponding to each of the transmitted power levels and the received power levels of the base station.

9 Claims, 6 Drawing Sheets

U.S. PATENT DOCUMENTS

| | | | |
|---|---|---|---|
| 6,845,245 B2 * | 1/2005 | Hunzinger | 455/510 |
| 6,845,246 B1 * | 1/2005 | Steer | 455/522 |
| 6,850,506 B1 * | 2/2005 | Holtzman et al. | 370/335 |
| 6,862,462 B2 * | 3/2005 | Hirabe | 455/562.1 |
| 6,895,245 B2 * | 5/2005 | Wallentin | 455/436 |
| 6,904,283 B2 * | 6/2005 | Li et al. | 455/450 |
| 6,952,568 B2 * | 10/2005 | Lin | 455/115.4 |
| 6,952,591 B2 * | 10/2005 | Budka et al. | 455/517 |
| 7,010,321 B2 * | 3/2006 | Chi et al. | 455/522 |
| 7,043,244 B1 * | 5/2006 | Fauconnier | 455/442 |
| 7,054,293 B2 * | 5/2006 | Tiedemann et al. | 370/335 |
| 7,146,172 B2 * | 12/2006 | Li et al. | 455/452.1 |
| 7,180,879 B2 * | 2/2007 | Sinnarajah et al. | 370/335 |
| 7,340,267 B2 * | 3/2008 | Budka et al. | 455/522 |
| 7,400,614 B2 * | 7/2008 | Buehrer et al. | 370/342 |

FOREIGN PATENT DOCUMENTS

| | | |
|---|---|---|
| JP | 11-340947 | 12/1999 |
| JP | 2001-217774 | 8/2001 |

* cited by examiner

CODE DIVISION MULTIPLE ACCESS COMMUNICATION SYSTEM, AND A BASE STATION CONTROL DEVICE AND A BASE STATION THEREOF

BACKGROUND OF THE INVENTION

1. Field of the Invention

The present invention generally relates to code division multiple access (CDMA) technology, and especially relates to a code division multiple access communication system, and a base station control device and a base station thereof.

2. Description of the Related Art

In a code division multiple access radio communications system, communications are performed by assigning a code that is unique to each of a plurality of subscribers, and assigning the same wide range frequency band to the subscribers at the same time. For a specified communication through a channel, all other ongoing communications provided through other channels constitute an interference signal, whether the channels are in a cell to which the specified communication is being performed, or in other cells. Moreover, the power of a base station defines the number of subscribers that can be accommodated in the base station (or a sector), and the range of a service area of the base station. Therefore, transmission power and a target level of received power should be controlled such that there are no excesses or deficiencies. That is, the power levels should be controlled such that a desired signal to noise ratio (S/N) and a desired frame error rate (FER) are achieved. If optimal control is performed, the number of subscribers that can be accommodated in the entire communication system will be maximized. In a conventional communication system, a maintenance terminal for managing two or more base stations and base station control devices are used to predict and determine various parameters about the power of the base station, and control the base station, such that the maximum subscriber accommodation of the communication system is attained. The conventional communication system as mentioned above may provide optimal control, when the cell environment for communications, such as the number of subscribers, the number of base stations, and others, is relatively static, with few changes.

However, in actual operations, the cell environment dynamically changes according to various factors such as change of the number of subscribers, spatial deviation of the subscribers, temporal deviation of traffic from day to night, addition and deletion of the base stations, and change of a neighboring building. In order to optimally perform the power control of each base station, a quick response to the changes of the cell environment is required. By the conventional technique, if the cell environment changes, the maintenance terminal that manages the base station etc. needs to analyze and perform simulation such that parameters of the base stations etc. are reconfigured, which consumes time. When the cell environment changes rapidly, the parameters that are predicted as above may no longer be optimal.

SUMMARY OF THE INVENTION

Accordingly, the objectives of the present invention are to offer a quick response to the change of the cell environment, and to optimize the power control of the base station, which substantially obviate one or more of the problems caused by the limitations and disadvantages of the related art.

Features and advantages of the present invention will be set forth in the description that follows, and in part will become apparent from the description and the accompanying drawings, or may be learned by practice of the invention according to the teachings provided in the description. Objects as well as other features and advantages of the present invention will be realized and attained by the base station and the base station control device particularly pointed out in the specification in such full, clear, concise, and exact terms as to enable a person having ordinary skill in the art to practice the invention.

To achieve these and other advantages and in accordance with the purpose of the present invention, as embodied and broadly described herein, the present invention provides means as described below.

The code division multiple access communication system 100 of the present invention includes a base station 104 that communicates with two or more communication terminals 102, using two or more radio channels 105, and a base station control device 106 that controls the base station 104, wherein a variation range (xmax-xmin, ymax-ymin) of transmitted power or received power of the base station is adjusted, based on power distribution of the radio channels, as shown in FIG. 5, wherein the power distribution is acquired by the base station 104 counting the number ($A_i$) of the radio channels corresponding to the transmitted power or the received power ($x_i$) of the base station 104.

The above-described functions can be performed by the base station control device 106 of the present invention, which, then, includes an power distribution calculation means (210) configured to obtain the power distribution (FIG. 5) of a radio channel by the base station 104 counting the number ($A_i$) of the radio channels relevant to a predetermined power value ($x_i$) transmitted or received from all the radio channels used for radio communications, and an adjustment means (210 and 204) configured to adjust the variation range (xmax-xmin, ymax-ymin) of the transmitted power or the received power of the base station based on the power distribution of the radio channel.

The power distribution calculation means obtains the power distribution (404) of a radio channel through which radio communications are not completed normally (uncompleted calls).

According to the present invention, the variation range of the transmitted power or the received power is adjusted autonomously without intervention of the maintenance terminal, such that a prompt response to change in the cell environment is achieved. Also, when radio communications are not completed due to shortage of power, a prompt and accurate response is provided, using the power distribution of the radio channel through which the radio communications did not complete normally.

DESCRIPTION OF THE PREFERRED EMBODIMENTS

In the following, embodiments of the present invention will be described with reference to the accompanying drawings.

Figure 1:
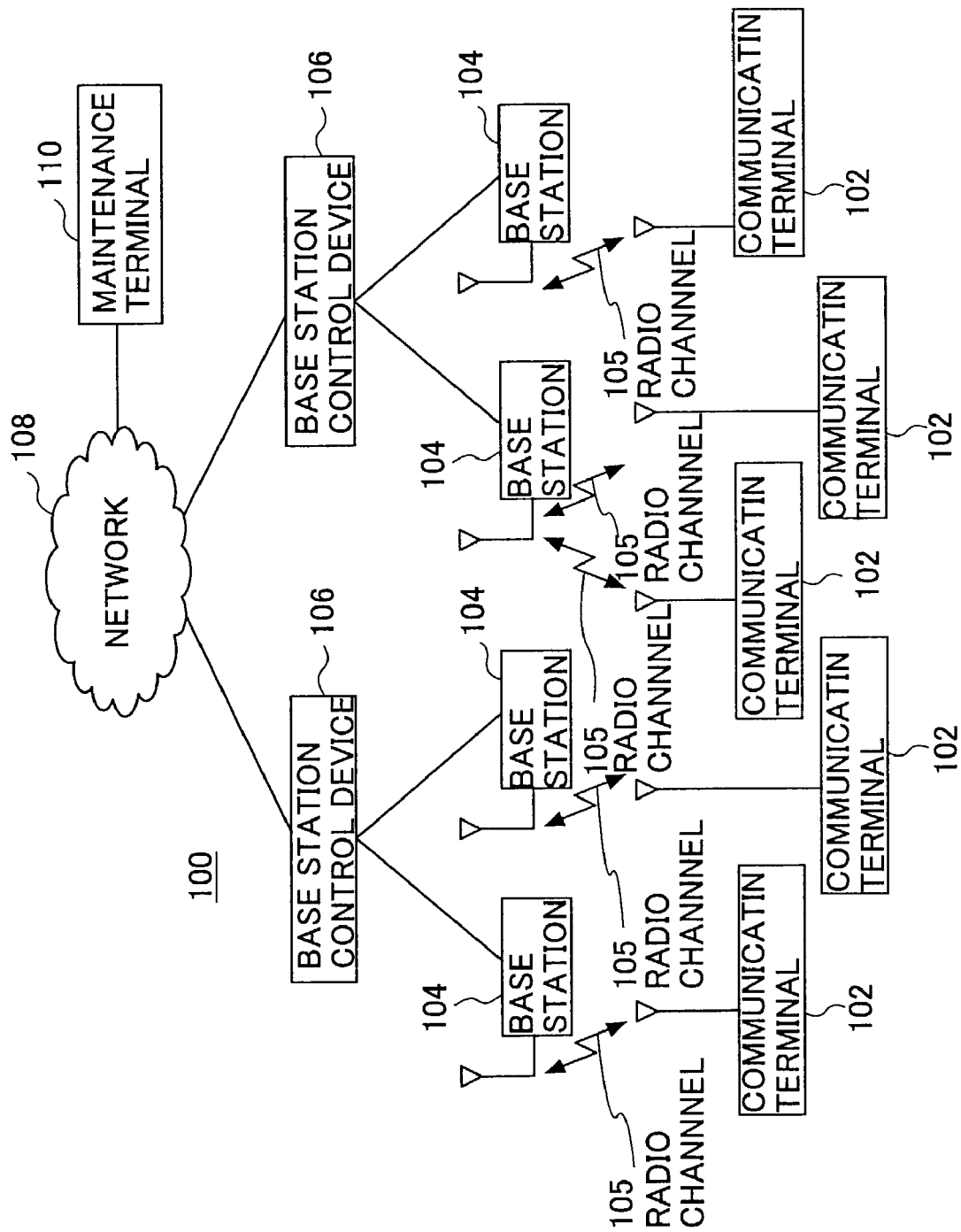
FIG. 1 shows an outline view of a code division multiple access communication system 100 of the present invention.

FIG. 1 shows an outline view of an embodiment of a code division multiple access (CDMA) communication system 100 of the present invention. The CDMA communication system 100 includes two or more communication terminals 102, a base station 104 that communicates with the communication terminals 102 through a radio link 105, and a base station control device 106 that controls two or more base stations 104. The base station control device 106 is connected to a maintenance terminal 110 through an existing network like the Internet, for example.

Figure 2:
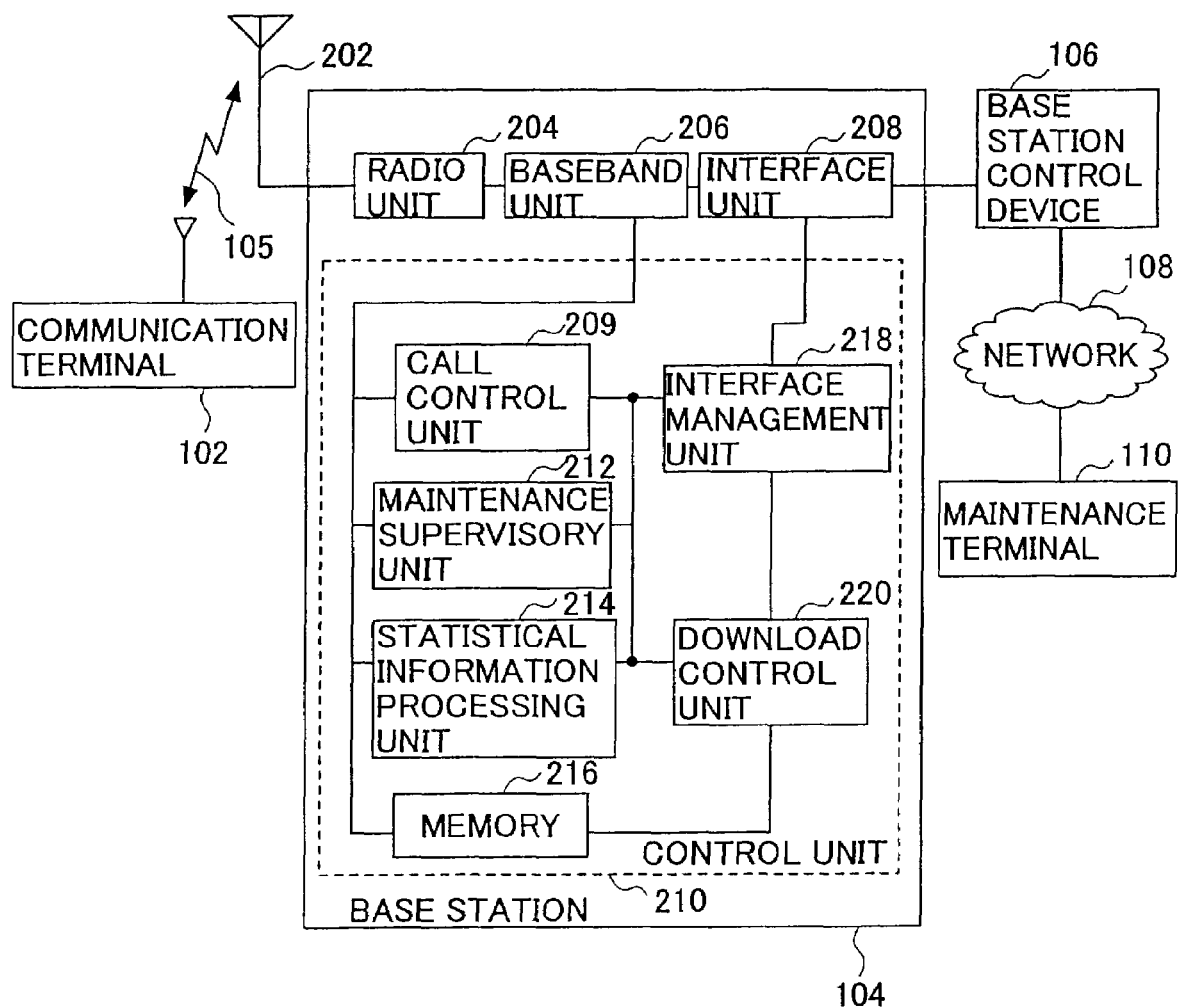
FIG. 2 shows a detailed view of a base station 104 of the present invention.

FIG. 2 shows a detailed view of an embodiment of the base station 104 of the present invention. In FIG. 2, the same reference numbers are given to the same elements as explained in FIG. 1. The base station 104 includes an antenna 202 for performing radio communications with the communication terminal 102, a radio unit 204 connected to the antenna 202, a baseband unit (BB unit) 206 connected to the radio unit 204, and an interface unit (I/F unit) 208 that interfaces the base station control device 106 connected to the BB unit 206. The radio unit 204 carries out processes that are necessary for performing radio communications, such as frequency conversion between the frequency of received radio signals and intermediate frequencies (IF), and between the frequency of transmitted radio signals and IF, the signals being received and transmitted through the antenna 202, and demodulation of the received signals at IF and modulation of the transmitted signals at IF. The BB unit 206 and the I/F unit 208 are connected to the control unit 210. The I/F unit 208 is connected to the base station control device 106 located outside of the base station 104. The control unit 210 includes a call control unit 209, a maintenance supervisory unit 212, and a statistical information processing unit 214, and a memory 216. Furthermore, the control unit 210 includes an I/F management unit 218 connected to the I/F unit 208, the call control unit 209, the maintenance supervisory unit 212, and the statistical information processing unit 214; and a download control unit 220 connected to the I/F management unit 218, the statistical information processing unit 214, and the memory 216. Here, although the control unit 210 is prepared in the base station 104 in the present embodiment, the control unit 210 may be included in the base station controller 106.

Generally, the base station 104 shown in FIG. 2 adjusts the variation range of the transmitted power of the base station, or the variation range of the target received power based on predetermined parameters downloaded from the maintenance terminal 110, and predefined statistical information acquired from the communication terminal 102 that is in communication. In this manner, a prompt response to changes of the cell environment is provided, such as changes of traffic from day to night, and vice versa.

Figure 3:
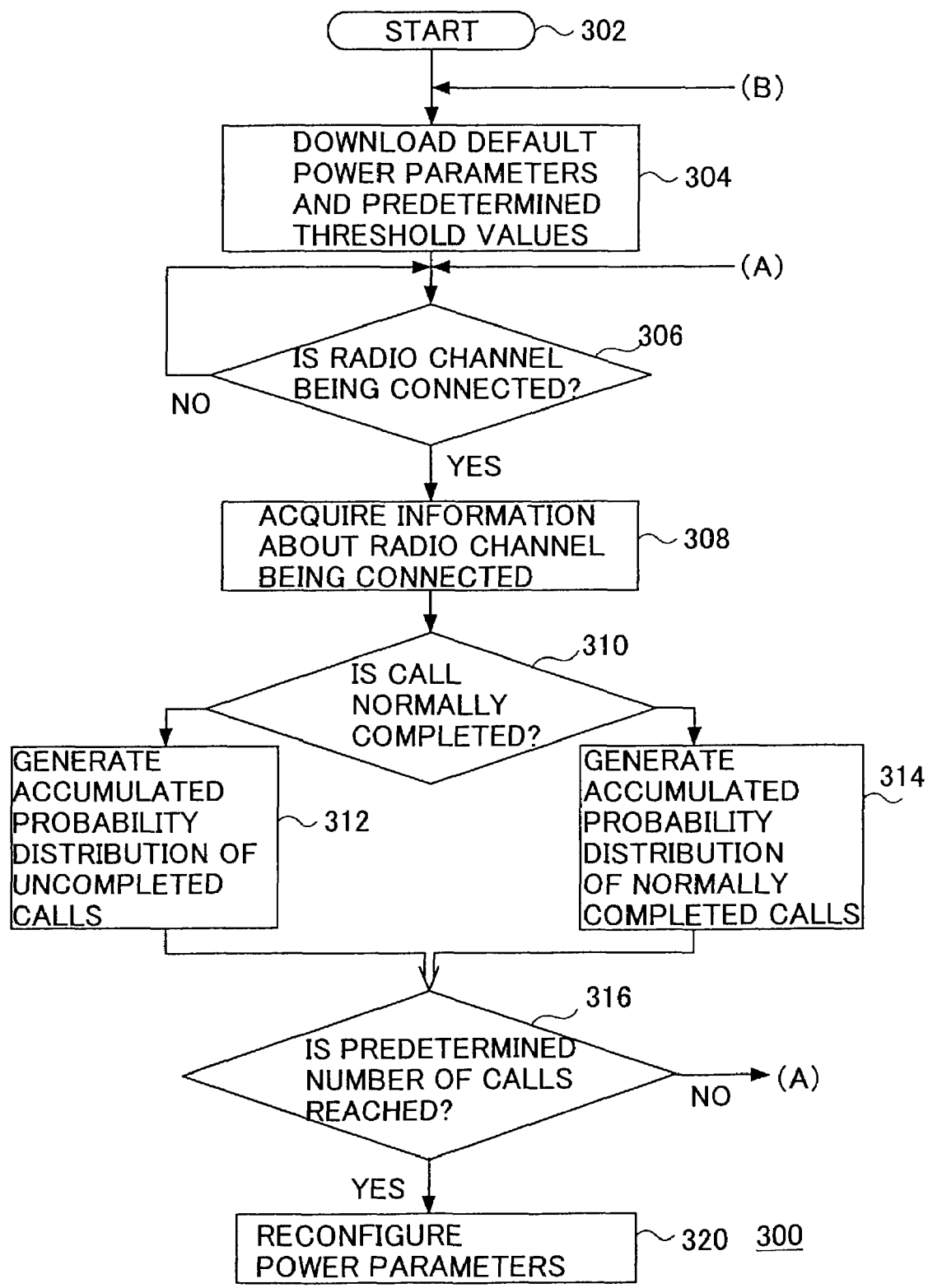
FIG. 3 is a flowchart that shows operations performed mainly by the base station 104.

FIG. 3 is a flowchart showing operations of the base station 104 shown in FIG. 2. Hereafter, the operations are explained with reference to FIG. 3 and FIG. 2. The operations start at step 302 of a flow 300 shown in FIG. 3. The maintenance supervisory unit 212 in the control unit 210 of the base station 104 monitors information from the maintenance terminal 110 through the I/F unit 208 and the I/F management unit 218. At step 304, the maintenance terminal 110 directs the base station 104 to download default power parameters and predetermined threshold values, and the base station 104 downloads the default parameters and values. The downloading is performed under control of the download control unit 220. Downloaded information is stored in the memory 216. The default power parameters include a minimum transmission power ratio, a maximum transmission power ratio, and an initial transmission power ratio concerning the downlink from the base station 104 to the communication terminal 102. Here, the transmission power ratio is a rate of the transmission power of each radio channel to the total transmission power of the base station (the transmission power of each channel/the total transmission power). The default power parameters further include a maximum received power target value, a minimum received power target value, and an initial received power target value concerning the uplink from the communication terminal 102 to the base station 104. The predetermined threshold values include reconfiguring threshold values P1 and P2 (see FIG. 5), a call loss ratio threshold value, and a guaranteed number of simultaneous calls, and the like. Detailed descriptions will be given later.

At step 306, the base station 104 determines whether there is a call, i.e., whether a radio channel is being used. If there are no calls, the flow 300 does not go beyond step 306, rather, presence of a call is checked for again. When it is determined that there is a call, information about the radio channel of the call is collected from the BB unit 206 at step 308. The collected information is stored in the memory 216. The information is acquired under the control of the call control unit 209. The acquired information (statistical information) includes transmitted power of a downlink, received power of an uplink (power that the base station received), and an index that indicates whether the call is successfully completed. Calls that are not completed normally (uncompleted calls) include, for example, calls disconnected compulsorily, calls disconnected due to unsatisfactory communication quality, and the like. Step 310 determines whether a call is successfully completed, using the criterion described above. When a call is determined to be successfully completed, the process progresses to step 314. Otherwise, the process progresses to step 312.

At step 312, accumulated probability distribution of the transmitted power levels and the received power levels for the uncompleted calls are generated. The statistical information processing unit 214 (refer to FIG. 2) that performs the main functions of "power distribution calculation means" carries out the generating process.

Figure 4:
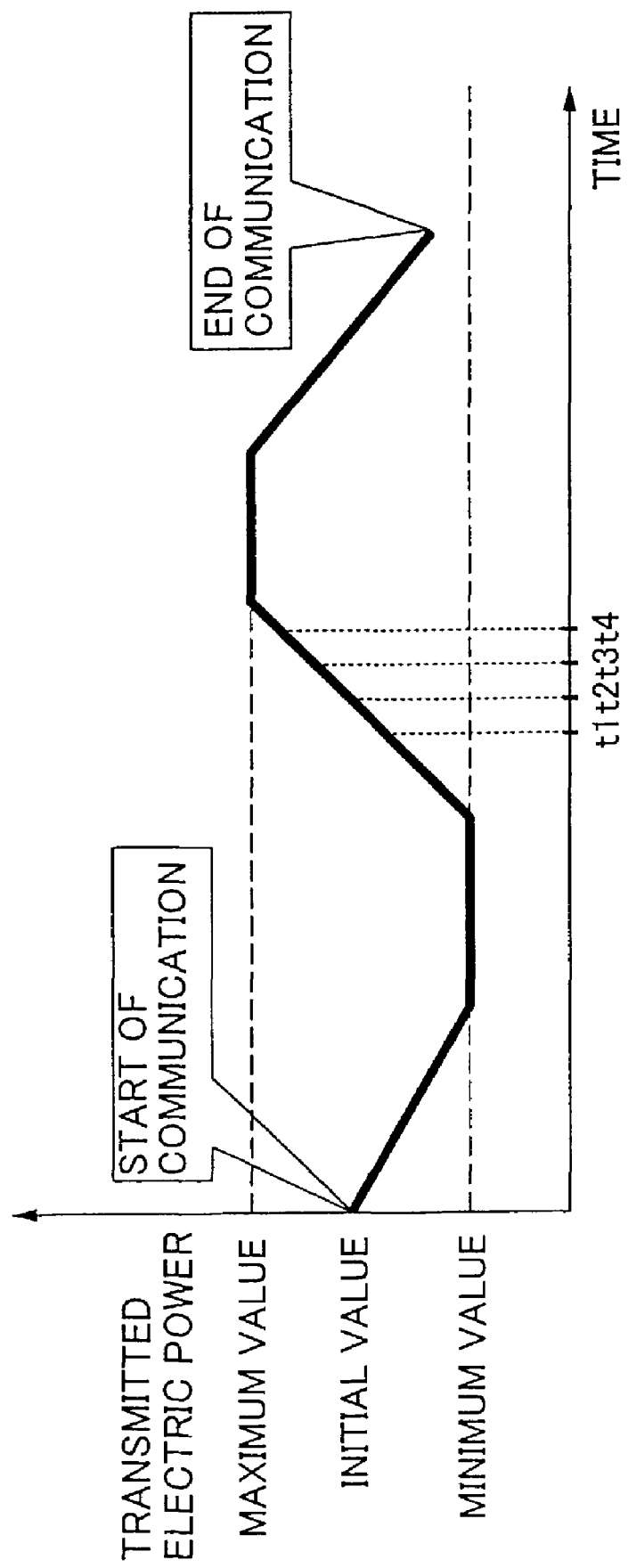
FIG. 4 is a graph that shows relations between transmitted power of a call in progress and time.

FIG. 4 shows how the transmitted power of a connected call is controlled as the time changes. All the calls, whether completed normally or otherwise, are controlled in a manner such as shown in FIG. 4. The transmitted power is controlled to begin from a predetermined value (initial value), to change gradually between the maximum value and the minimum value, and to maintain a fixed value. An accumulated probability distribution is computed as follows. First, the transmitted power values at points in time t1, t2, t3, and t4 are expressed by x1, x2, x3, and x4, respectively. For simplicity, the intervals between adjacent points in time are described as a constant value T. That is, t4−t3=t3−t2=t2−t1=T. The transmitted power values x1 through x4 are converted to power values X1, X2, X3, and X4 that are used in the power distribution analysis, according to a formula that follows.

$$x1 \leq X1 < x2$$

$$x2 \leq X2 < x3$$

$$x3 \leq X3 < x4$$

$$x4 \leq X4$$

Here in the present explanation, the number of the points in time is set at four for explanation purposes. However, any number N of points in time may be considered.

Under a premise such as above, when a call is uncompleted, the total number of the uncompleted calls is incremented by one. Then, it is determined to which Xi (X1 through X4), transmitted power Pi, which is actually used for the call, belongs. When the call is considered uncompleted at the power Xi, a counting value Ai corresponding to the power Xi is incremented by one. By repeating the processes from step 306 through step 316 for a predetermined number of times, a table such as below is generated, and stored in the memory 216 (refer to FIG. 2).

| Transmitted power value | Counting value |
|---|---|
| X1 | A1 |
| X2 | A2 |
| ... | ... |
| XN | AN |

Here, X1<X2< . . . <XN. At step 312, the accumulated probability is calculated using the power distribution values obtained in this manner. In this case, the accumulated probability represents a probability P1k of all the collected uncompleted calls having a transmitted power value falling between x1 and xk (k<=N). That is, since the accumulated probability expresses a probability of the value of the power actually transmitted falling below Xk (dB) (1<=k<=n), the accumulated probability in the case of n=k (k<=n) is calculated by $\Sigma Ai$ (i=1, 2, . . . k)/$\Sigma Ai$ (i=1, 2, . . . N). This calculation process is performed until the number of calls that should be collected reaches a predetermined value (step 316). The same calculation process is performed about the received power that the base station received, such that the power distribution values and accumulated probability of the received power value and the counting value are computed about the uncompleted calls.

At step 314, a calculation process almost the same as explained in step 312 is performed for calls that are determined normally completed at step 310. That is, the process for computing the power distribution values of the transmitted power, the accumulated probability distribution of the transmitted power, the power distribution values of the received power, and the accumulated probability distribution of the received power for the completed calls is performed until a predetermined number of the calls are checked.

When it is determined that the predetermined number of calls to be checked is reached at step 316, the process progresses to step 320 where the power parameters are reconfigured. Before explaining step 320, the accumulated probability distributions generated at step 312 and step 314 are explained.

Figure 5:
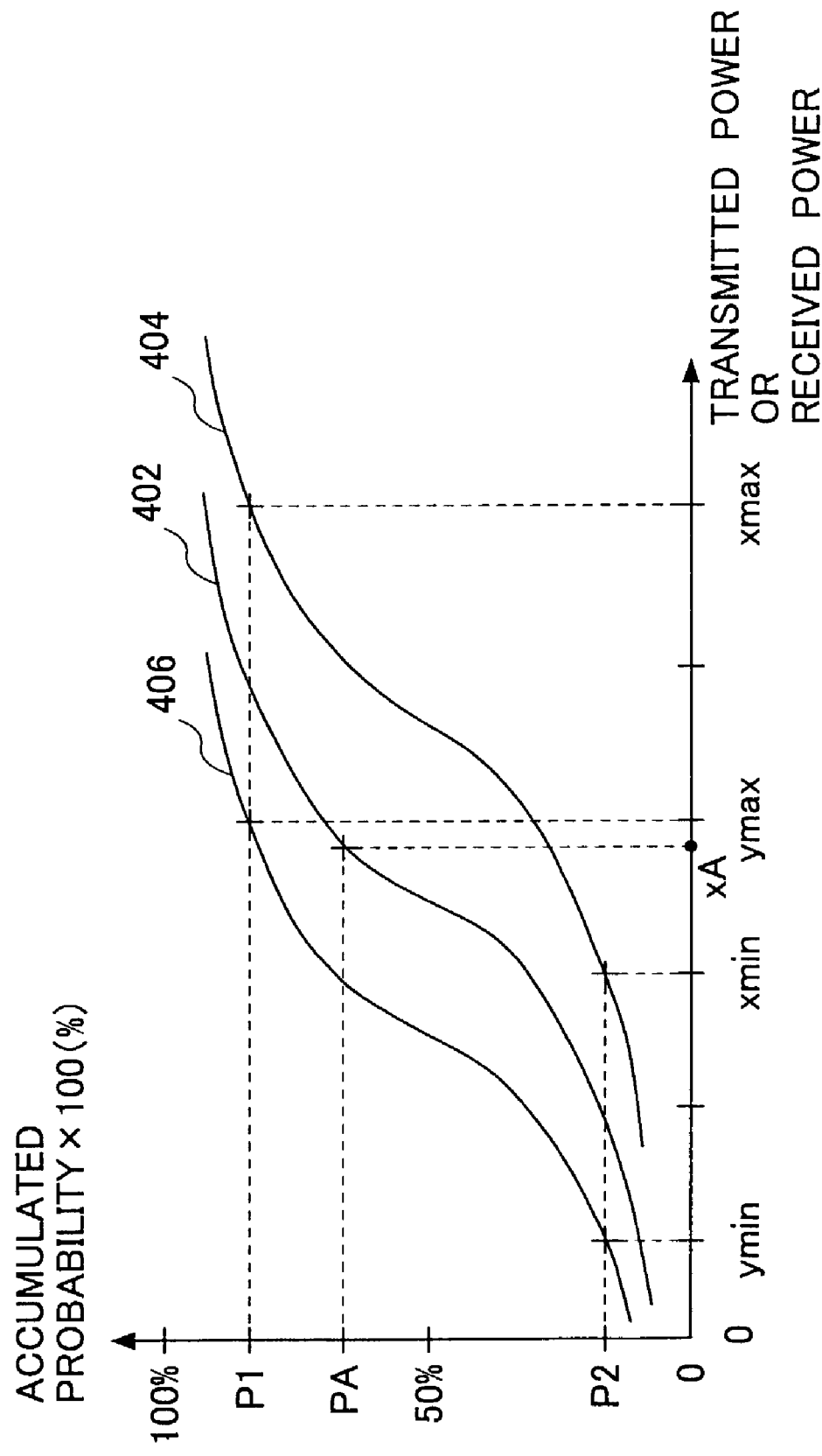
FIG. 5 shows a graph of an accumulated probability distribution of transmitted power levels or received power levels.

FIG. 5 shows a graph of the accumulated probability distribution of the transmitted power or the received power. The vertical axis expresses the accumulated probability and the horizontal axis shows the transmitted power or the received power. For simplicity, the horizontal axis here is considered as expressing the transmitted power, however, generality is not lost. The curve 402 represents the accumulated distribution obtained in a session immediately prior to a session that is to start. At step 312, accumulated probability distribution is generated about the uncompleted calls, based on the information that the base station collects. A main cause for a call to be uncompleted is shortage of the transmitted power of the base station or the communication terminal. Therefore, when a call is uncompleted, the accumulated probability distribution curve is shifted to the right-hand side, and becomes like the curve 404. In this case, the transmitted power value that is required to maintain the probability PA gets larger than xA. That is, unless the base station transmits larger power, predetermined communication quality cannot be satisfied. On the other hand, at step 314, when a call is completed normally, the accumulated probability distribution is generated about the normally completed calls. The probability distribution in this case becomes like the curve 406 that is shifted to the left-hand side, contrary to the previous case. That is, the probability PA can be satisfied with power that is smaller than xA. In this manner, the power distribution (accumulated distribution) of the radio channel used for communications changes according to change of the cell environment.

Figure 6:
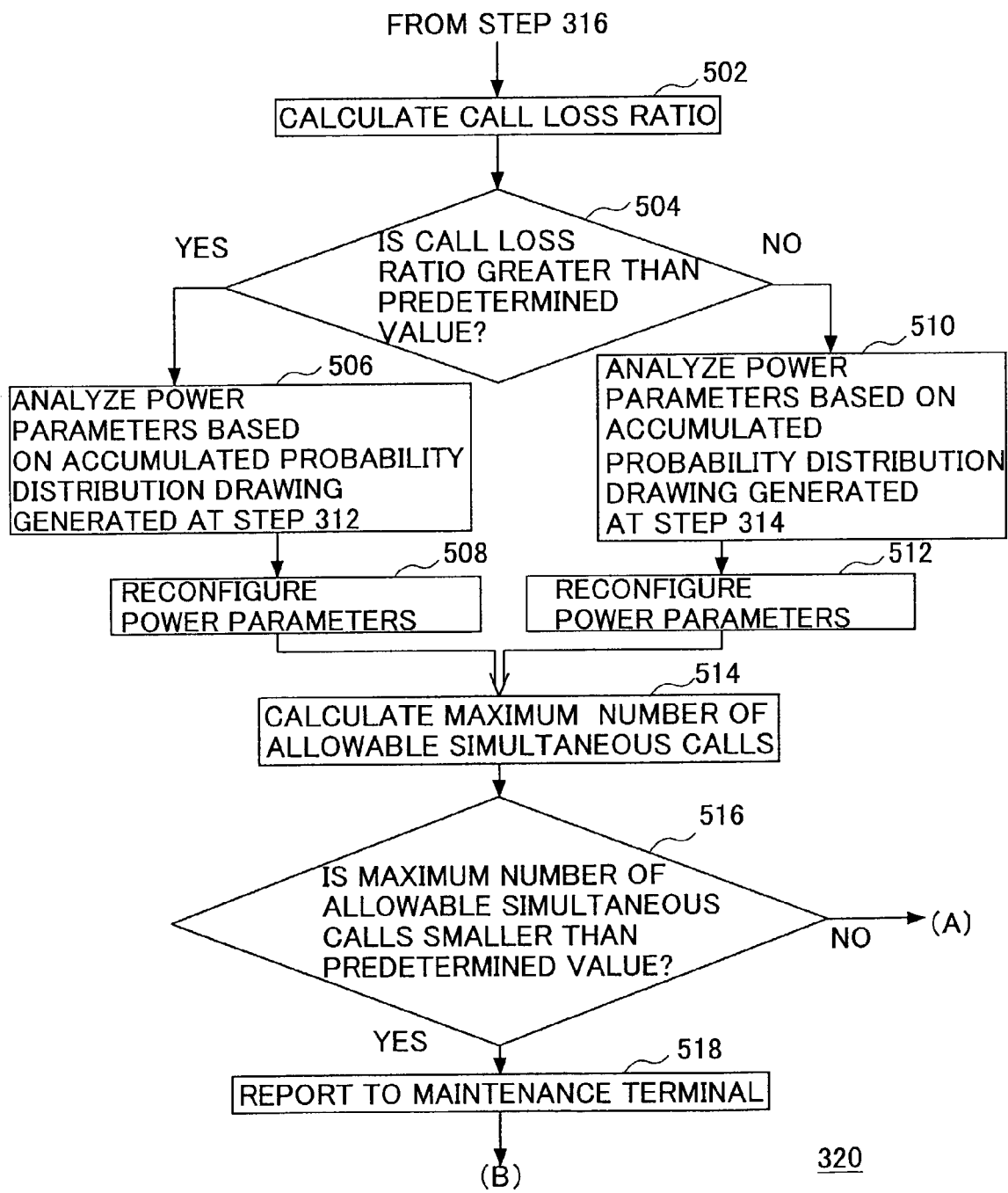
FIG. 6 shows a detailed flowchart of step 320, shown in FIG. 3, for reconfiguring the power parameters.

FIG. 6 shows details of the process at step 320 where the power parameters are reconfigured. The process is performed by controlling an amplifier and the like in the radio unit 204 under control of the control unit 210 (especially statistical information processing unit 214), where main functions of "adjustment means" are performed. First, a call loss ratio is calculated at step 502. The call loss ratio is defined as:

(call loss ratio)=(number of uncompleted calls)/(predetermined number of calls).

The predetermined number of calls is the number of calls as described at step 316 of FIG. 3, and equal to the sum of the completed calls and the uncompleted calls. By definition, a possibility is that power is insufficient when the call loss ratio is large. To the contrary, if the call loss ratio is small, it is likely that the power is excessive. At step 504, it is determined whether the call loss ratio is greater than a predetermined value. The predetermined value may be provided from the maintenance terminal 110 (FIG. 2), or may be pre-installed in the base station 104. If it is determined that the call loss ratio is greater than the predetermined value at step 504, the process progresses to step 506.

At step 506, power parameters are reconfigured using the accumulated probability distribution (curve 404 of FIG. 5) obtained at step 312. As mentioned above, the main cause of there being a large call loss ratio is a shortage of transmitted power of the base station (or the communication terminal). Then, the transmitted power of the base station is increased, such that the number of uncompleted calls is reduced, and the call loss ratio becomes small. Specifically, maximum transmitted power xmax corresponding to the first reconfiguring threshold value P1, which is 90% for example, in curve 404 is set as the parameter, such that the probability of the call to be uncompleted due to quality degradation because of power shortage decreases. Next, the minimum transmitted power xmin that the base station transmits is determined using the second reconfiguring threshold P2, which is 10%, for example. As for the initial transmitted power, transmitted power xin corresponding to a third reconfiguring threshold P3, which is 50%, for example, is provided. In this manner, the maximum transmitted power xmax, the minimum transmitted power xmin, and the initial transmitted power xin, which the base station transmits, are determined. Thus, at step 508, the transmitted power parameters of the base station are actually changed using the calculated power values. That is, the variation range of the transmitted power of the base station is adjusted to a new range defined by the maximum transmitted power xmax and the minimum transmitted power xmin. However, if the maximum transmitted power value xmax that is obtained is over the capability of the base station (equipment limit), it is impossible for the base station to actually increase the transmitted power beyond the limit, and to accommodate more subscribers. In this case, the base station supplies information of the fact to the maintenance terminal 110 (not shown). Here, the minimum transmitted power value xmin was obtained based on the second reconfiguring threshold P2. However, xmin may be obtained by subtracting a predetermined value from the maximum transmitted power value xmax, which is desirable from a viewpoint of securing a range of variation (dynamic range) of the transmitted power of the base station.

The target received power of the base station is obtained and reconfigured similarly to obtaining the transmitted power, the maximum transmitted power xmax, the minimum transmission power xmin, and the initial transmission power xin, and reconfiguring the variation range of the transmission power of the base station. That is, maximum target received power xmax, minimum target received power xmin, and initial target received power xin are obtained, and the variation range of the target received power is reconfigured. However, if the maximum target received power value xmax obtained is in excess of the power capability (equipment limit) of the communication terminal, it is impossible to increase the target received power (transmitted power of the communication terminal) at the base station, and to accommodate more subscribers. In this case, the base station provides information of the fact to the maintenance terminal 110 (not shown). Here, the minimum received power value xmin is obtained based on the second reconfiguring threshold P2. However, xmin may be obtained by subtracting a predetermined value from the maximum received power value xmax, which is desirable from a viewpoint of securing a range of variation (dynamic range) of the received power of the base station.

Contrary to the above, if it is determined that the call loss ratio is smaller than the predetermined value at step 504, the process progresses to step 510. At step 510, the power parameters are reconfigured using the accumulated probability distribution (curve 406 of FIG. 5) obtained at step 314. As mentioned above, the call loss ratio being small indicates that frequency of uncompleted calls occurring is low, and that the transmission power of the base station is sufficient. Rather, the transmission power of the base station may be excessive, when the call loss ratio is very small. Excessive power transmitted from the base station increases interference to other cells, for example. In this case, the excessive transmission power of the base station should be decreased. Specifically, the base station is reconfigured to transmit the maximum transmission power ymax corresponding to the first reconfiguring threshold P1, which is, for example, 90% in curve 406. Since the transmission power for every call is reduced, the amount of interference is minimized, and, as the result, more subscribers can be accommodated. Next, the minimum transmission power yin, which the base station transmits, is determined using the second reconfiguring threshold P2, which is 10%, for example. About the initial transmission power, a value yin corresponding to the third reconfiguring threshold P3, which is 50%, for example, is provided. In this manner, the maximum transmission power ymax, the minimum transmission power ymin, and the initial transmission power yin, which the base station transmits, are determined. Thus, at step 508, the transmission power parameters of the base station are actually changed using the calculated power values. That is, the variation range of the transmission power of the base station is adjusted to a new range defined by the maximum transmission power ymax and the minimum transmission power ymin. Here, the minimum transmission power value ymin was obtained based on the second reconfiguring threshold P2. However, ymin may be obtained by subtracting a predetermined value from the maximum transmission power value ymax, which is desirable from a viewpoint of securing a range of variation (dynamic range) of the transmission power of the base station.

The target received power of the base station is obtained and the variation range of the target received power is reconfigured in a similar manner of obtaining the maximum transmission power ymax, the minimum transmission power ymin, and the initial transmission power yin, and reconfiguring the variation range of the transmission power of the base station. That is, about the target received power of the base station, the maximum target received power ymax, the minimum target received power ymin, and the initial target received power yin are determined, and the variation range of target received power is adjusted. It is also possible to subtract a predetermined value from the maximum target received power value ymax rather than to calculate the minimum target received power value ymin corresponding to the second reconfiguring threshold P2, securing the dynamic range of the received power of the base station.

The power parameters (xmax, xmin, xin, ymax, ymin, yin) are reconfigured in the manner as described above, and used for future calls.

At step 514, the number of the maximum allowable simultaneous calls is calculated according to the following formula.

(the number of the maximum allowable simultaneous calls)=(the maximum transmission power)/(the maximum allowable transmission power)

The maximum allowable transmission power of the right-hand side denominator is the possible maximum power that can be assigned to a call channel, and the maximum transmission power of the numerator is the total power that the base station transmits. Therefore, the number of the maximum allowable simultaneous calls expresses the smallest number of subscribers that can be accommodated in the cell. At step 516, the number of the maximum allowable simultaneous calls is compared with a predetermined value (the number of guaranteed simultaneous calls) that is provided from the maintenance terminal 110, and when the former is greater than the predetermined value, the process returns (A) (before step 306 of FIG. 3). In this case, the base station can serve more simultaneous calls than the number of simultaneous calls that the maintenance terminal is going to guarantee. On the other hand, when the number of the maximum allowable simultaneous calls is smaller than the predetermined value, the number of simultaneous calls will become smaller than the number of simultaneous calls that the maintenance terminal is going to guarantee. In this case, the fact is provided to the maintenance terminal at step 518, the flow 320 returns to (B) (before step 304 of FIG. 3), and the maintenance terminal makes other base stations (or the base station) download new parameters as necessary. In this manner, the service area of other base stations is expanded, for example, and the number of simultaneous calls that the whole system is capable of serving can be maximized. Here, before returning to (A) or (B), or after returning thereto, the number of calls counted, which has reached the predetermined value is reset to zero.

Moreover, since the parameter that governs the number of subscribers in a code division multiple access system is an power value, if the transmitted power value per subscriber is increased, the number of subscribers that can be served will decrease. According to the embodiment of the present invention, it is possible to control such that no more than a predetermined guaranteed number of terminals are accepted in a cell by providing the number of the maximum allowable simultaneous calls to the maintenance terminal based on the power parameters that are reconfigured, restricting call origination and location registration. Here, restriction of call origination means, for example, that call attempts are refused at a fixed rate, which may be based on an identification number (MSID) of a communication terminal and restricting conditions (if it is a 50% restriction, only one communication terminal of every two communication terminals is allowed to make a call), which is performed by the communication terminal itself. The location registration restriction restricts location registration of the communication terminal, therefore, the communication terminal is prohibited not only to originate, but also to receive a call.

As mentioned above, according to the embodiment of the present invention, the base station or the base station control device reconfigures the power parameters (xmax, xmin, xin, ymax, ymin, yin) that determine the variation range of the transmission power of the base station and the communication terminal based on the power distribution (accumulated distribution) of the radio channel, which the base station or the base station control device obtains, and the reconfiguring threshold values P1, and P2 provided from the maintenance terminal 110. Processing load for obtaining the power distribution of the radio channel, which changes according to changes of the cell environment, is much lighter than simulation tasks conventionally performed by the maintenance terminal. For this reason, the base station etc. can reconfigure the power parameters autonomously and promptly, according to the changes of the cell environment, such that the transmission power control of the base station is optimally performed without the maintenance terminal predicting power parameters.

As mentioned above, according to the present invention, the transmission power control of the base station is optimized, providing prompt response to the changes of the cell environment.

Further, the present invention is not limited to these embodiments, but various variations and modifications may be made without departing from the scope of the present invention.

The present application is based on Japanese priority application No. 2002-106194 filed on Apr. 9, 2002, with the Japanese Patent Office, the entire contents of which are hereby incorporated by reference.

What is claimed is:

1. A code division multiple access communication system, comprising
   a base station that provides radio communications to a plurality of communication terminals using a plurality of radio channels, and
   a base station control device that controls the base station,
   wherein a variation range of each transmission power and received power of the base station is adjusted, based on power distribution values of the radio channels used for the radio communications, the power distribution values being acquired by the base station counting the number of the radio channels having each of a plurality of predetermined transmission power levels or each of a plurality of predetermined received power levels of the base station,
   wherein the basic station acquires the power distribution values of the radio channel, the radio communication through which is not completed normally.

2. A base station control device of a code division multiple access communication system, the base station control device controlling a base station that provides radio communications to a plurality of communication terminals using a plurality of radio channels, comprising:
   a power distribution calculation unit configured to acquire power distribution values of a radio channel by the base station counting the number of the radio channels relevant to each of a plurality of predetermined transmission power levels or each of a plurality of predetermined received power levels; and
   an adjustment unit configured to adjust a variation range of the transmission power levels and the received power levels of the base station, based on the power distribution values of the radio channel,
   wherein the power distribution calculation unit acquires the power distribution values of the radio channel, the radio communication through which is not completed normally.

3. A base station of a code division multiple access communication system, the base station providing radio communications to a plurality of communication terminals using a plurality of radio channels, comprising:
   a power distribution calculation unit configured to acquire power distribution values of a radio channel by the base station counting the number of the radio channels relevant to each of a plurality of predetermined transmission power levels or each of a plurality of predetermined received power levels; and
   an adjustment unit configured to adjust a variation range of the transmission power levels and the received power levels of the base station, based on the power distribution values of the radio channel,
   wherein the power distribution calculation unit acquires the power distribution values of the radio channel, the radio communication through which is not completed normally.

4. The base station as claimed in claim 3, wherein the variation range of one or both of the transmission power level of the base station and the received power level of the base station are adjusted when a call loss ratio is greater than a predetermined value, the call loss ratio being obtained based on a ratio of the number of radio channels through which radio communications are not completed normally to the total number of radio channels through which radio communications are conducted for calls completed normally plus calls not completed normally.

5. The base station as claimed in claim 3, wherein the power distribution values are an accumulated probability distribution.

6. The base station as claimed in claim 5, wherein the variation range of one or both of the transmission power level of the base station and the received power level of the base station are adjusted based on the power value corresponding to a predetermined value of the accumulated probability.

7. The base station as claimed in claim 3, wherein the number of maximum allowable simultaneous calls is reported to a maintenance terminal connected through a network, and the number of the maximum allowable simultaneous calls is obtained based on a ratio of the maximum transmission power of the base station to the maximum power that can be assigned to one of the radio channels when the number of the maximum allowable simultaneous calls on the radio channels is smaller than a predetermined value.

8. A base station of a code division multiple access communication system, the base station providing radio communications to a plurality of communication terminals using a plurality of radio channels, comprising:
   a power distribution calculation unit configured to acquire power distribution values of a radio channel by the base station counting the number of the radio channels relevant to each of a plurality of predetermined transmission power levels or each of a plurality of predetermined received power levels; and an adjustment unit configured to adjust a variation range of the transmission power levels and the received power levels of the base station, based on the power distribution values of the radio channel, wherein the power distribution values are an accumulated probability distribution, and wherein the variation range of one or both of the transmission power level of the base station and the received power level of the base station are adjusted based on the power value corresponding to a predetermined value of the accumulated probability.

9. A base station of a code division multiple access communication system, the base station providing radio communications to a plurality of communication terminals using a plurality of radio channels, comprising:

a power distribution calculation unit configured to acquire power distribution values of a radio channel by the base station counting the number of the radio channels relevant to each of a plurality of predetermined transmission power levels or each of a plurality of predetermined received power levels; and an adjustment unit configured to adjust a variation range of the transmission power levels and the received power levels of the base station, based on the power distribution values of the radio channel, wherein the number of maximum allowable simultaneous calls is reported to a maintenance terminal connected through a network, and the number of the maximum allowable simultaneous calls is obtained based on a ratio of the maximum transmission power of the base station to the maximum power that can be assigned to one of the radio channels when the number of the maximum allowable simultaneous calls on the radio channels is smaller than a predetermined value.

* * * * *